United States Patent [19]

Numazawa et al.

[11] Patent Number: 4,723,643
[45] Date of Patent: Feb. 9, 1988

[54] POWER TRANSMITTING SYSTEM FOR AUTOMOTIVE VEHICLE, INCORPORATING AUTOMATICALLY-OPERATED CONSTANT-MESH TRANSMISSION AND CLUTCH DEVICE

[75] Inventors: Akio Numazawa, Nagoya; Akira Sato, Susono; Fumihiro Ushijima, Okazaki; Hideaki Matsui, Gotenba, all of Japan

[73] Assignee: Toyota Jidosha Kabushiki Kaisha, Aichi, Japan

[21] Appl. No.: 929,055

[22] Filed: Nov. 10, 1986

[30] Foreign Application Priority Data

Nov. 13, 1985 [JP] Japan ................. 60-254353

[51] Int. Cl.⁴ ............... B60K 41/28; F16D 25/10; F16D 47/04
[52] U.S. Cl. .................. 192/0.08; 74/858; 192/0.092; 192/3.58; 192/48.92; 192/87.11
[58] Field of Search ............. 192/0.062, 0.08, 3.58, 192/48.4, 48.92, 87.11, 87.1, 0.092; 74/858, 872, 336 R

[56] References Cited

U.S. PATENT DOCUMENTS

| | | | |
|---|---|---|---|
| 2,136,811 | 11/1938 | Burtnett | 192/48.92 X |
| 2,382,438 | 8/1945 | Orr | 192/48.4 |
| 3,072,234 | 1/1963 | Maurice et al. | 192/48.92 X |
| 3,187,598 | 6/1965 | Hennessey et al. | 192/48.92 |
| 3,805,632 | 4/1974 | Prokop et al. | 192/48.92 X |

Primary Examiner—Rodney H. Bonck
Attorney, Agent, or Firm—Parkhurst & Oliff

[57] ABSTRACT

An automatic power transmitting system operatively connected to an engine of an automotive vehicle, having a constant-mesh transmission with at least one synchromesh device which is operated by an actuator device to selectively establish a plurality of gear positions. The system includes a first and a second clutch which are disposed in parallel relation with each other, between the engine of the vehicle and the constant-mesh transmission. The first clutch has a one-way clutch operable to transmit an output of the engine to the constant-mesh transmission, and is engaged while the vehicle is in a normal drive mode. The second clutch is engaged while the vehicle is in an engine brake mode. Each synchromesh device is operated to effect a shifting operation after the opening of the throttle valve of the engine is reduced, and without disengaging the first clutch before the operation of the synchromesh device.

6 Claims, 10 Drawing Figures

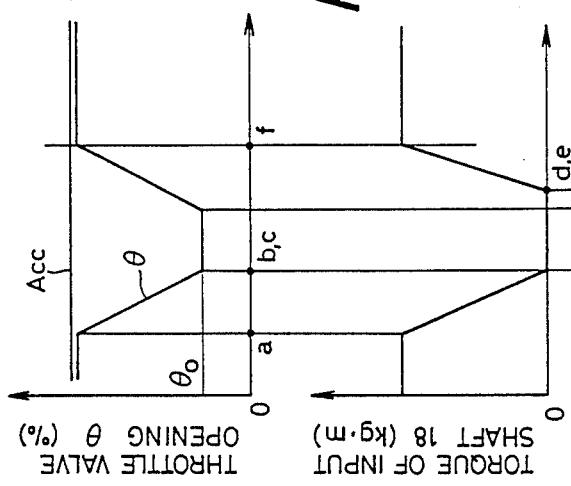
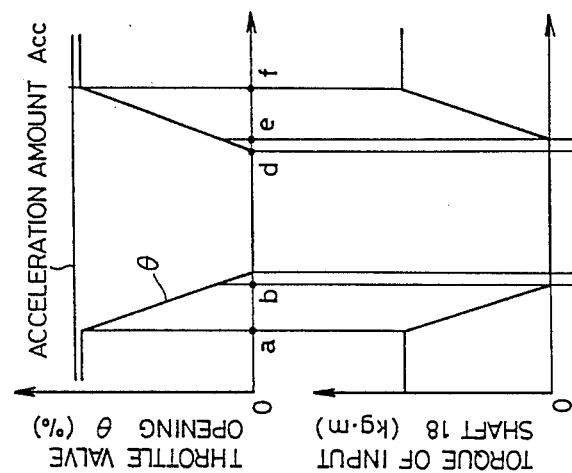

POWER TRANSMITTING SYSTEM FOR AUTOMOTIVE VEHICLE, INCORPORATING AUTOMATICALLY-OPERATED CONSTANT-MESH TRANSMISSION AND CLUTCH DEVICE

BACKGROUND OF THE INVENTION

The present invention relates in general to an automatic power transmitting system for an automotive vehicle, and more particularly to improvements in such an automatic power transmitting system which incorporates a constant-mesh transmission with synchromesh devices for a plurality of gear positions, and which assures an enhanced shifting feel of the transmission.

As an automatic power transmitting system for use in a motor vehicle, there is known a system which uses a constant-mesh transmission having synchromesh devices that are operated by a suitable actuator device, to selectively establish one of a plurality of gear or speed positions. A vehicle equipped with this type of automatic power transmitting system has a fuel economy comparable to that equipped with a manually operated transmission.

When the constant-mesh transmission of the above power transmitting system is automatically shifted, a clutch disposed between the engine of the vehicle and the input shaft of the constant-mesh transmission must be disengaged before the appropriate synchromesh device of the transmission is operated by the actuator device to establish the appropriate gear position, that is, after the engine output has been temporarily reduced to a suitable level by reducing the throttle valve opening. Further, the clutch must be re-engaged after the synchromesh device has been operated into position for establishing the gear position. Therefore, the shifting operation of the constant-mesh transmission requires a relatively long time during which the clutch is placed in the disengaged state, i.e., during which the transmission is disconnected from the engine. This relatively long time of disengagement of the clutch gives the vehicle driver a poor feel of shifting of the transmission. For minimizing the time of disengagement of the clutch, the transmitting system must require a controller which is capable of achieving a complicated and sophisticated timing control of the engaging and disengaging actions of the clutch.

SUMMARY OF THE INVENTION

It is accordingly an object of the present invention to provide a power transmitting system for an automotive vehicle which incorporates an automatically operated constant-mesh transmission connected to a clutch device, and which assures an improved shifting feel of the constant-mesh transmission, without a complicated control of the clutch upon shifting operations of the constant-mesh transmission.

The above object is achieved according to the present invention, which provides an automatic power transmitting system operatively connected to an engine of an automotive vehicle, having a constant-mesh transmission with at least one synchromesh device which is operated by an actuator device to selectively establish a plurality of gear positions, the automatic power transmitting system comprising: a first clutch disposed between the engine of the vehicle and the constant-mesh transmission, and having a one-way clutch which is operable to transmit an output of the engine to the constant-mesh transmission; a second clutch disposed in parallel with the first clutch, between the engine and the constant-mesh transmission; a first actuator for moving the first clutch between an engaged position for transmitting the output of the engine to the constant-mesh transmission, and a disengaged position, a second actuator for moving the second clutch between an engaged position for connecting the engine and the constant-mesh transmission, and a disengaged position; and a controller for controlling the first and second actuators, such that the first clutch is placed in the engaged position while the vehicle is in a normal drive mode, and such that the second clutch is placed in the engaged position while the vehicle is in an engine brake mode.

In the automatic power transmitting system of the present invention constructed as described above, the constant-mesh transmission may be shifted from one gear position to another by the actuator device after the output of the engine is temporarily reduced to a level lower than actually required, while the vehicle is running with the first clutch held in the engaged position. Therefore, the shifting operation of the constant-mesh transmission does not require disengagement and re-engagement of the clutch device (first clutch) before and after the shifting operation of the constant-mesh transmission by means of the appropriate synchromesh device by the actuator device. Consequently, the shifting operation may be accomplished in a shorter length of time, resulting in an improved shifting feel of the constant-mesh transmission. Further, the shifting operation does not require a complicated and intricate timing control for such engagement and re-engagement of the clutch device. Thus, the controller may be simplified.

According to one feature of the invention, the power transmitting system further comprises a clutch housing which is connected to an output shaft of the engine for rotation therewith, such that the first and second clutches are accommodated within the clutch housing.

In one form of the above feature of the invention, the first and second clutches, and the first and second actuators, constitute parts of a clutch device accommodated in the clutch housing. The first and second clutches comprise a first and a second rotor, respectively, which are connected to an input shaft of the constant-mesh transmission for rotation therewith, and the clutch device includes a common friction plate disposed between the first and second rotors. The first and second actuators consist of a first and a second hydraulically operated piston, respectively, which are slidably movable for axially moving the first and second rotors, respectively, for engagement of the first and second rotors with the common friction plate.

In the above form of the invention, the clutch device further includes a first hub splined on the input shaft of the constant-mesh transmission, and the first and second clutches are connected via the first hub to the input shaft for rotation therewith. The clutch device may further include a second hub radially outwardly of the first hub, so that the one-way clutch is interposed between the first and second hubs, the first rotor being fixed to the second hub via a first damper, and the second rotor being fixed to the first hub via a second damper.

Usually, the opening of a throttle valve of the engine is adjusted by a throttle actuator according to an amount of depression or operation of the accelerator pedal. According to the invention, the controller associated with the throttle actuator for the throttle valve, shift actutor device for the at least one synchromesh device, and first and second clutch actuators for the first and second clutches, may be adapted such that the controller operates the first and second clutch actuators so as to place the first clutch in the engaged position while the vehicle is in a normal drive mode, and so as to place the second clutch in the engaged position while the vehicle is in an engine brake mode, and such that upon a shifting operation of the constant-mesh transmission from one of the plurality of gear positions to another the controller operates the throttle actuator to temporarily reduce the opening of the throttle valve, and then operates the shift actuator device to effect the shifting operation without operating the first clutch actuator to bring the first clutch to the disengaged position prior to the operation of the shift actuator device.

BRIEF DESCRIPTION OF THE DRAWINGS

The above and other objects, features and advantages of the present invention will be better understood by reading the following detailed description of a preferred embodiment of the invention, when considered in connection with the accompanying drawings, in which:

FIGS. 5a-5c are timing charts illustrating a shift-up operation of the transmitting system of FIG. 1; and FIGS. 6a-6c are timing charts illustrating a shift-down operation of the transmitting system of FIG. 1.

DETAILED DESCRIPTION OF THE PREFERRED EMBODIMENT

Figure 1:
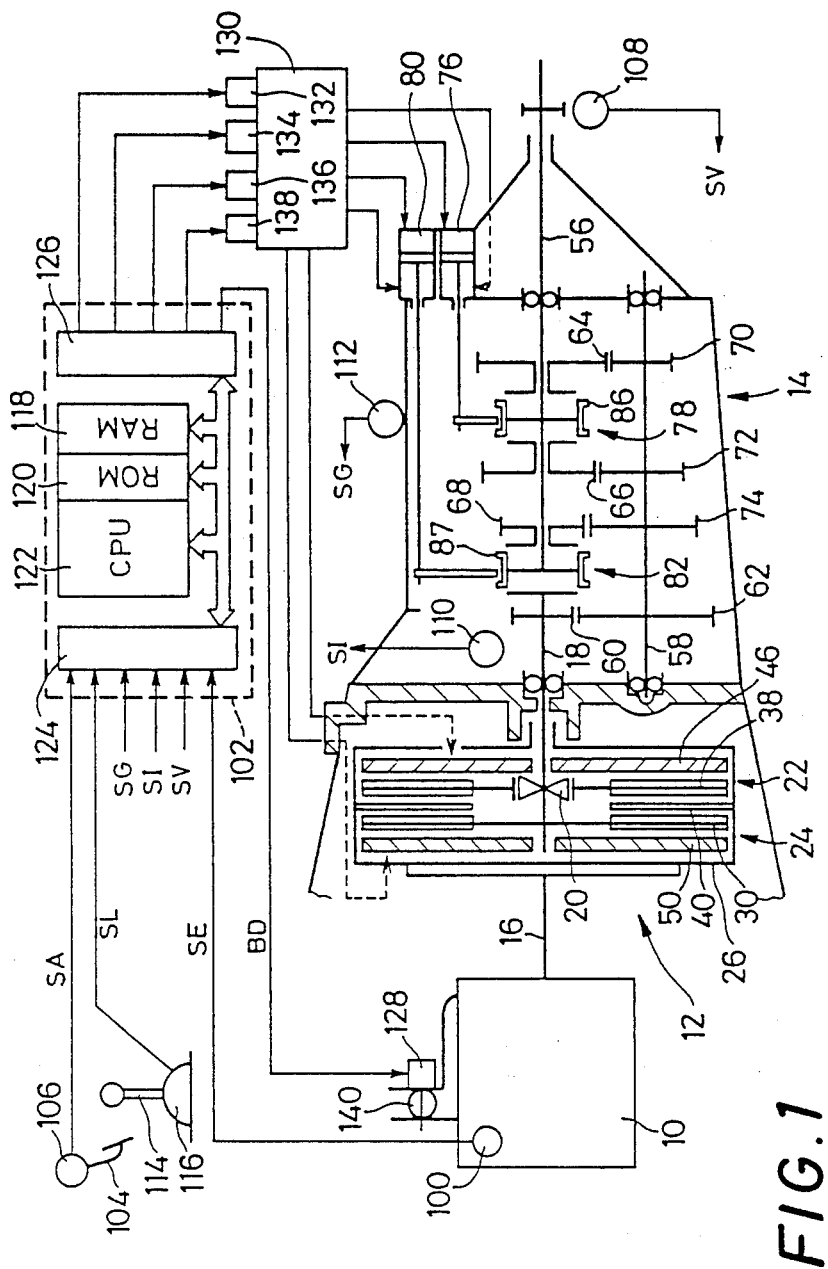
FIG. 1 is a schematic view of one embodiment of an automatic power transmitting system of the invention.

Referring first to FIG. 1, there is shown an automatic power transmitting system for a motor vehicle, wherein a power output of an engine 10 of the vehicle is transmitted to drive wheels of the vehicle through a clutch device 12, a constant-mesh transmission 14, and a differential gear device not shown.

The clutch device 12 is disposed between a crankshaft 16 of the engine and an input shaft 18 of the transmission 14. The clutch device 12 includes a first clutch 22 and a second clutch 24 which are disposed in parallel relation with each other. The first clutch 22 has a one-way clutch 20 adapted to effect power transmission only in the direction from the engine 10 toward the constant-mesh transmission 14, i.e., from the crankshaft 16 toward the input shaft 18. The second clutch 24 is adapted to directly couple the crankshaft 16 with the input shaft 18.

Figure 2:
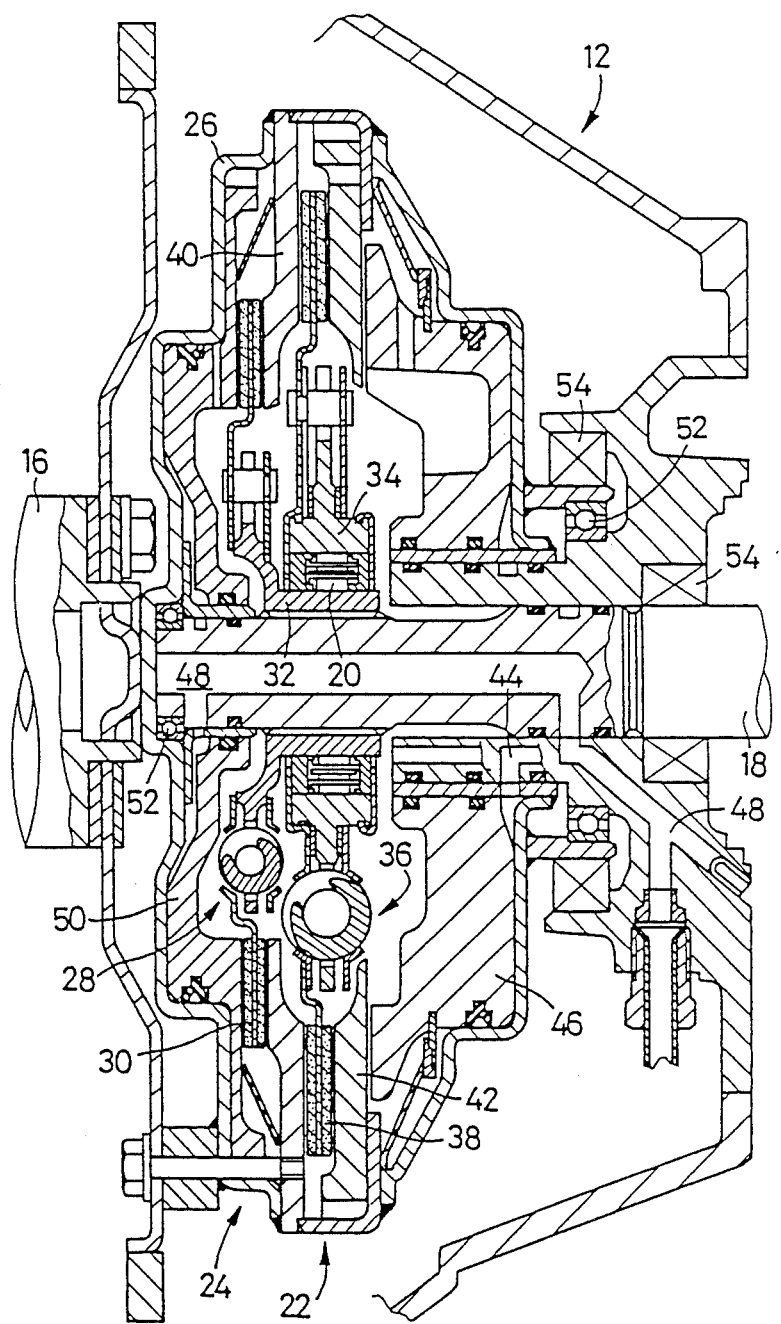
FIG. 2 is an elevational view in cross section showing the detailed construction of a clutch device incorporated in the power transmitting system of FIG. 1.

Described more specifically with reference to FIG. 2, the clutch device 12 has a clutch housing 26 which is attached to the end of the crankshaft 16 remote from the engine 10. The housing 26 accommodates the first and second clutches 22, 24, and the end portion of the input shaft 18 remote from the transmission 14. The clutch housing 26 and the input shaft 18 are arranged so that these two rotary members are rotatable relative to each other. The input shaft 18 has a first hub 32 splined on its end portion. The hub 32, which is axially slidable on the input shaft 18, supports a second rotor 30 fixed thereto by means of a second damper 28. A second hub 34 is mounted on the first hub 32, with the one-way clutch 20 interposed therebetween, such that the first and second hubs 32, 34 are rotatable relative to each other. The second hub 34 is adapted to support a first rotor 38 fixed thereto by means of a first damper 36. Between the first and second rotors 38, 30 within the clutch housing 26, there is disposed an annular friction plate 40 which is secured to the housing 26. To force the first rotor 38 against the friction plate 40, a pressure plate 42 is disposed such that the plate 42 is axially movable relative to the first rotor 38.

A first piston 46 is provided within the clutch housing 26, on one side of the pressure plate 42 nearer to the transmission 14. This first piston 46 is slidably moved with a pressurized working fluid which is supplied from a hydraulic control unit 130 (FIG. 1) via a fluid passage 44 (FIG. 2), in order to activate the pressure plate 42. That is, the pressure plate 42 is pushed by the first piston 46 in the axial direction, to force the first rotor 38 against the friction plate 40. Similarly, a second piston 50 is disposed within the clutch housing 26, on one side of the second rotor 30 nearer to the engine 10. The second piston 50 is slidably moved on the input shaft 18, with the pressurized fluid supplied via another fluid passage 48, in order to force the second rotor 30 against the friction plate 40. Reference numerals 52 and 54 designate bearings and oil seals, respectively.

Referring back to FIG. 1, the constant-mesh transmission 14 includes an output shaft 56 coaxial with the input shaft 18, and a countershaft 58 which is disposed parallel to the input and output shafts 18, 56. The countershaft 58 is rotated by the input shaft 18, via coupling gears 60 and 62 fixed to the input shaft and countershaft 18, 58, respectively. The output shaft 56 has a first gear 64, a second gear 66 and a third gear 68, which are all disposed rotatably with respect to the output shaft 56. The countershaft 58 has three gears 70, 72 and 74 fixed thereto, which are held in mesh with the corresponding first, second and third gears 64, 66, 68 freely rotatably mounted on the output shaft 56. With the countershaft 58 rotated by the input shaft 18, the first, second and third gears 64, 66, 68 are rotated by the three mating gears 70, 72, 74, at different speeds that are lower than the speed of the input shaft 18. The rotating speeds of the first, second and third gears 64, 66, 68 increase in the order of the description.

The output shaft 56 has a first synchromesh device 78 for operatively connecting the first or second gear 64, 66 thereto, and a second synchromesh device 82 for operatively connecting the third gear 68 or the input shaft 18 thereto. The first synchromesh device 78 has a sleeve 86 axially moved by a first hydraulic cylinder 76, while the second synchromesh device 82 has a sleeve 87 axially moved by a second hydraulic cylinder 80. With the sleeve 86 of the first synchromesh device 78 moved to the right (as seen in FIG. 1) by the first hydraulic cylinder 76, the first gear 64 is connected to the output shaft 56, whereby the constant-mesh transmission 14 is shifted to a first-gear or first-speed position. With the sleeve 86 moved to the left, the second gear 66 is connected to the output shaft 56, whereby the transmission 14 is shifted to a second-gear or second-speed position. Similarly, a movement of the sleeve 87 of the second synchromesh device 82 to the right (as seen in FIG. 1) by the second hydraulic cylinder 80 will cause the third gear 68 to be connected to the output shaft 56, thereby placing the transmission 14 in a third-gear or third-speed position. The transmission 14 is brought into a fourth-gear or fourth-speed position when the sleeve 87 is moved to the left to connect the output shaft 56 to the input shaft 18.

Figure 3:
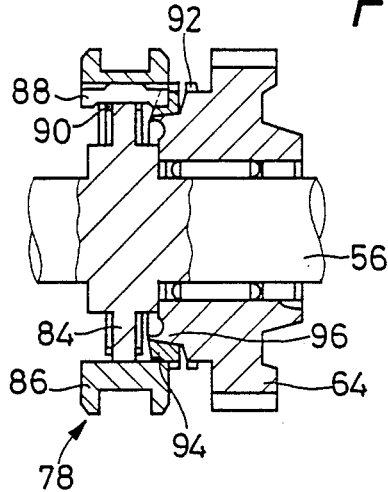
FIG. 3 is a fragmentary elevational view in cross section of a synchromesh device of a constant-mesh transmission incorporated in the power transmitting system of FIG. 1.

The first and second synchromesh devices 78, 82 have a construction as well known in the art. The detailed construction of the fist synchromesh device 78 is illustrated in FIG. 3, by way of example, wherein the device includes: a hub 84 fixed to the ouptut shaft 56; the above-indicated sleeve 86 which is rotatable with the hub 84, and axially movable relative to the hub 84, and which is axially moved by the first hydraulic cylinder 76; a key 88 disposed on the inner surface of the sleeve 86 and movable with the sleeve 86; a spring 90 for biasing the key 88 in the radially outward direction of the sleeve 86; a clutch gear 92 formed on the first gear 64; and a synchronizer ring 94 disposed between the sleeve 86 and the clutch gear 92. When the sleeve 86 is moved toward the rotating first gear 64, the key 88 forces the synchronizer ring 94 against a coned portion 96 of the first gear 64, and holds the synchronizer ring 94 in frictional contact with the coned portion 96. As a result, the hub 84 is rotated with an increasing speed, until the rotation of the hub 84 is synchronized with that of the first gear 64. Finally, the sleeve 86 is brought into engagement with the clutch gear 92 formed on the first gear 64. Thus, the input shaft 18 is operatively connected to the output shaft 56 via the counter-shaft 58, gear 70, first gear 64 and the first synchromesh device 78.

The engine 10 is provided with a first speed sensor 100 for sensing a rotating speed Ne of the engine. The first speed sensor 100 generates an ENGINE SPEED signal SE indicative of the engine speed Ne, which is applied to a controller 102. The vehicle has an accelerator pedal 104, whose amount of operation Acc is detected by an acceleration sensor 106 disposed adjacent to the pedal 104. The acceleration sensor 106 produces an ACCELERATION signal SA indicative of the amount of operation Acc. This signal SA is also applied to the controller 102. Adjacent to the output shaft 56, there is provided a second speed sensor 108 which generates a VEHICLE SPEED signal SV indicative of a rotating speed of the output shaft 56, which corresponds to the running speed V of the vehicle. The VEHICLE SPEED signal SV is also fed to the controller 102. Further, a third speed sensor 110 is disposed near the input shaft 18, to detect a rotating speed Ni of the input shaft 18. The controller 102 receives from this third speed sensor 110 an INPUT SPEED signal SI indicative of the speed Ni of the input shaft 18. For sensing the currently selected gear or speed position of the constant-mesh transmission 14, a first postion sensor 112 is provided, which generates a GEAR POSITION signal SG. This signal SG is also applied to the controller 102. The vehicle has a gearshift lever 114, whose position is detected by a second position sensor 116 which generates a LEVER POSITION signal SL to be received by the controller 102.

The controller 102 consists of a microcomputer which includes a random-access memory 118 (RAM 118), a read-only memory 120 (ROM 120), a central processing unit (CPU 122), an input interface 124, and an output interface 126. The CPU 122 is operated to process the various signals as described above, according to control programs stored in the ROM 120, utilizing a temporary storage function of the RAM 118. The engine 10 is provided with a throttle actuator 128 for operating a throttle valve 140. The hydraulic control unit 130 has solenoid-operated valves 132, 134, 136 and 138. Based on the processed signals, the controller 102 applies a drive signal BD to the throttle actuator 128 to control the throttle valve 140, and drive signals to the solenoid-operated valves 132, 134, 136 and 138 to operate the clutch device 12 and the constant-mesh transmission 14. The hydraulic control unit 130 incorporates a hydraulic pump driven by a suitable drive source such as the engine 10. The control unit 130 delivers the controlled pressurized fluid to the first and second cylinders 76, 80, and the first and second clutches 22, 24, according to the operations of the solenoid-operated valves 132, 134, 136 and 138.

The throttle valve 140 provided in an intake manifold of the engine 10 is operated by the throttle actuator 128 according to the drive signal BD from the controller 102, such that the opening $\theta$ of the throttle valve 140 is normally proportional to the amount of operation of the accelerator pedal 104 represented by the ACCELERATION signal SA. The solenoid-operated valves 132 an 134 are connected to the first and second hydraulic cylinders 76, 80 for controlling these cylinders so as to establish the selected gear or speed position of the constant-mesh transmission 14. The solenoid-operated valves 136 and 138 are connected to the first and second clutches 22, 24 of the clutch device 12, for controlling the frictional engaging actions of the clutches.

The operation of the present power transmitting system will be described.

Figure 4:
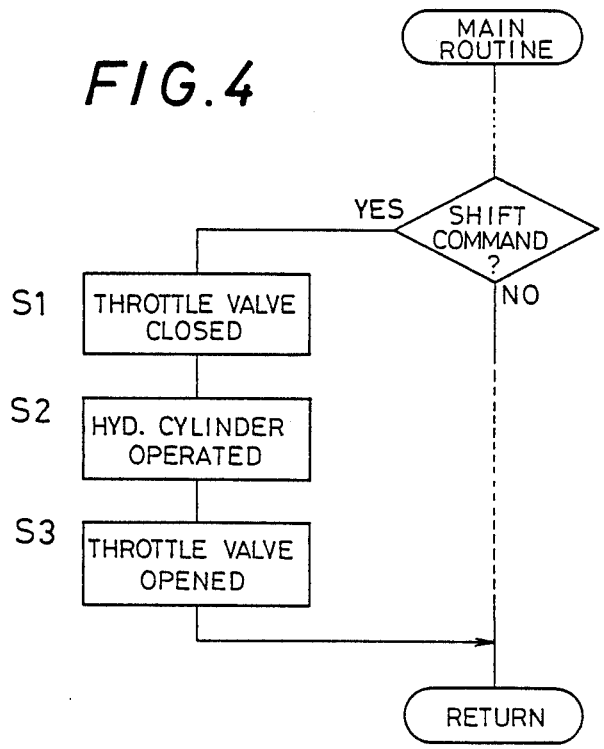
FIG. 4 is a flow chart showing a shifting operation of the transmitting system of FIG. 1.

The CPU 122 of the controller 102 is operable in one of a plurality of control modes such as START CONTROL, NEUTRAL CONTROL, SHIFT CONTROL, and ENGINE BRAKE CONTROL, which are selected depending upon the running conditions or parameters of the vehicle. When the ENGINE BRAKE CONTROL mode is selected during running of the vehicle, that is, when the vehicle is brought into an ENGINE BRAKE mode, the CPU 122 energizes the solenoid-operated valve 138 to effect an engaging action of the second clutch 24. When the CPU 122 is in the SHIFT CONTROL mode or the vehicle is running in a NORMAL DRIVE mode, however, the CPU 122 holds the solenoid-operated valve 138 in its deenergized position to keep the second clutch 24 disengaged, and at the same time holds the solenoid-operated valve 136 in its energized position to keep the first clutch 22 engaged. In the meantime, the CPU 122 commands the solenoid-operated valves 132 and 134 to effect a suitable shifting operation of the constant-mesh transmission 14, based on the current running speed V and acceleration Acc of the vehicle, and according to one of a plurality of shift patterns stored in the ROM 120. The shift patterns are selected depending upon the currently selected gear position of the transmission 14. That is, the transmission 14 is automatically shifted up or down from the currently selected gear position to another gear position, according to the selected shift pattern. For example, when a shift-up command is generated to shift up the transmission 14 from the second-gear position to the third-gear position, the steps as shown in FIG. 4 are executed.

Initially, the CPU 122 executes step S1 in which the supply of the drive signal BD to the throttle actuator 128 is stopped, to close the throttle valve 140. Then, the CPU 122 goes to step S2 wherein the solenoid-operated valve 132 is operated to activate the first hydraulic cylinder 76, so as to move the sleeve 86 to its neutral position, and then the solenoid-operated valve 134 is operated to activate the second hydraulic cylinder 80, so as to move the sleeve 87 toward the third gear 68. Thus, the constant-mesh transmission 14 is shifted to the third-gear position. This shifting operation is commenced when the CPU 122 has confirmed that the speed Ne of the engine 10 has been lowered below a preset limit corresponding to the appropriate gear position. With the synchronizing action of the second synchromesh device 82, the rotating speed of the input shaft 18 is lowered, for example, from 4000 r.p.m. down to 2000 r.p.m. Namely, the output shaft 56 is connected to the rotating third gear 68, whereby the shift up action of the transmission 14 is completed. Subsequently, step S3 is executed to apply the drive signal BD to the throttle actuator 128, to establish the opening of the throttle valve 140 which corresponds to the amount of acceleration Acc of the accelerator pedal 104. FIG. 5 illustrates changes in the opening $\theta$ of the throttle valve 140, torque of the input shaft 18, speed Ni of the input shaft 18, and speed Ne of the engine 10, after the shift-up command is generated. As shown in the figure, the engine speed Ne may be lower than the speed Ni of the input shaft 18 due to a slip of the one-way clutch 20, after the throttle valve 140 is closed. Therefore, the above-indicated shift-up operation may be accomplished without a disengaging action and a re-engaging action of the first clutch 22, which would otherwise be required before and after the shift-up operation. Consequently, the shift-up operation can be completed in a shorter time, and the shifting feel of the transmission 14 is improved. Further, the elimination of the disengagement and re-engagement of the first clutch 22 results in the elimination of a complicated and intricate timing control for these actions of the first clutch 22, leading to a simplified and less costly arrangement of the controller 102. In FIG. 5, reference characters "a", "b", "c", "d", "e" and "f" represent points of time as indicated below:

"a": point at which the shift-up operation is commenced;

"b": point at which the one-way clutch 20 starts to slip;

"c": point at which the first synchromesh device 78 starts to be operated;

"d": point at which the second synchromesh device 82 completes its operation;

"e": point at which the one-way clutch 20 ceases to slip; and

"f": point at which the shift-up operation is terminated.

On the other hand, if a shift-down command is generated in the SHIFT CONTROL mode, to shift-down the transmission 14, for example, from the fourth-gear position, the transmission 14 is automatically shifted down to the third-gear position, without disengaging and re-engaging actions of the first clutch 22, in a manner similar to that described above, also according to the steps shown in FIG. 4. More specifically, the opening $\theta$ of the throttle valve 140 is reduced to a suitable level $\theta$o. Then, the sleeve 87 of the second synchromesh device 82 which has established the fourth-gear position, is moved toward the third gear 68, and the throttle valve 140 is returned to a position corresponding to the current amount of acceleration Acc of the accelerator pedal 104. In this case, too, the slipping action of the one-way clutch 20 permits the speed Ne of the engine 20 to be lower than the speed Ni of the input shaft 18, thus making it possible to perform tht shift-down operation without disengagement and re-engagement of the first clutch 22 which would otherwise be required before and after the shifting operation. Therefore, the shift-down operation can be accomplished with a reduced time. FIG. 6 shows changes in the opening $\theta$ of the throttle valve 140, torque of the input shaft 18, speed Ni of the input shaft 18, and speed Ne of the engine 10, after the shift-down command is generated. Reference characters "a" through "f" represent the same points of time as used in FIG. 5.

While the present invention has been described in its preferred embodiment, it is to be understood that the invention is not limited thereto, but may be embodied with various changes, modifications and improvements, which may occur to those skilled in the art, without departing from the spirit and scope of the invention defined in the following claims.

What is claimed is:

1. An automatic power transmitting system operatively connected to an engine of an automotive vehicle, having a constant-mesh transmission with at least one synchromesh device which is operated by an actuator device to selectively establish a plurality of gear positions, said automatic power transmitting system comprising:

a first clutch disposed between the engine of the vehicle and said constant-mesh transmission, and having a one-way clutch which is operable to transmit an output of said engine to said constant-mesh transmission;

a second clutch disposed in parallel with said first clutch, between said engine and said constant-mesh transmission;

a first actuator for moving said first clutch between an engaged position for transmitting the output of said engine to said constant-mesh transmission, and a disengaged position;

a second actuator for moving said second clutch between an engaged position for connecting said engine and said constant-mesh transmission, and a disengaged position; and a controller for controlling said first and second actuators, such that said first clutch is placed in said engaged position while said vehicle is in a normal drive mode, and such that said second clutch is placed in said engaged position while said vehicle is in an engine brake mode.

2. An automatic power transmitting system according to claim 1, further comprising a clutch housing which is connected to an output shaft of said engine for rotation therewith, said first and second clutches being accommodated within said clutch housing.

3. An automatic power transmitting system according to claim 2, wherein said first and second clutches, and said first and second actuators, form parts of a clutch device accommodated in said clutch housing said first and second clutches comprising a first and a second rotor, respectively, which are connected to an input shaft of said constant-mesh transmission for rotation therewith, said clutch device including a common friction plate disposed between said first and second rotors, said first and second actuators consisting of a first and a second hydraulically operated piston, respectively, which are slidably movable for axially moving said first and second rotors, respectively, for engagement of said first and second rotors with said common friction plate.

4. An automatic transmitting system according to claim 3, wherein said clutch device further includes a first hub splined on said input shaft of said constant-mesh transmission, said first and second clutches being connected via said first hub to said input shaft for rotation therewith.

5. An automatic transmitting system according to claim 4, wherein said clutch device further includes a second hub radially outwardly of said first hub said one-way clutch being interposed between said first and second hubs, said first rotor being fixed to said second hub via a first damper, and said second rotor being fixed to said first hub via a second damper.

6. An automatic power transmitting system operatively connected to an engine of an automotive vehicle, having a constant-mesh transmission with at least one synchromesh device which is operated by a shift actuator device to selectively establish a plurality of gear positions, the vehicle having a throttle actuator for adjusting an opening of a throttle valve of the engine, said automatic power transmitting system comprising:

a first clutch disposed between the engine of the vehicle and said constant-mesh transmission, and having a one-way clutch which is operable to transmit an output of said engine to said constant-mesh transmission;

a second clutch disposed in parallel with said first clutch, between said engine and said constant-mesh transmission;

a first clutch actuator for moving said first clutch between an engaged position for transmitting the output of said engine to said constant-mesh transmission, and a disengaged position;

a second clutch actuator for moving said second clutch between an engaged position for connecting said engine and said constant-mesh transmission, and a disengaged position; and a controller associated with said throttle actuator, said shift actuator device, and said first and second clutch actuators, said controller operating said first clutch actuator such that said first clutch is placed in said engaged position while said vehicle is in a normal drive mode, and operating said second clutch actuator such that said second clutch is placed in said engaged position while said vehicle is in an engine brake mode, whereby upon a shifting operation of said constant-mesh transmission from one of said plurality of gear positions to another, said controller operates said throttle actuator to temporarily reduce the opening of said throttle valve, and then operates said shift actuator device to effect said shifting operation without operating said first clutch actuator to bring said first clutch to said disengaged position prior to the operation of said shift actuator device.

* * * * *